(12) United States Patent
Makino et al.

(10) Patent No.: US 9,174,593 B2
(45) Date of Patent: Nov. 3, 2015

(54) CONNECTING BLOCK ASSEMBLY

(71) Applicant: YAZAKI CORPORATION, Tokyo (JP)

(72) Inventors: Kimitoshi Makino, Makinohara (JP);
Koichi Uezono, Makinohara (JP);
Kenzou Yoshida, Makinohara (JP)

(73) Assignee: YAZAKI CORPORATION, Tokyo (JP)

( * ) Notice: Subject to any disclaimer, the term of this patent is extended or adjusted under 35 U.S.C. 154(b) by 68 days.

(21) Appl. No.: 14/072,968

(22) Filed: Nov. 6, 2013

(65) Prior Publication Data

US 2014/0127917 A1      May 8, 2014

(30) Foreign Application Priority Data

Nov. 8, 2012   (JP) .................................. 2012-245943

(51) Int. Cl.
| | | |
|---|---|---|
| *H01R 12/00* | (2006.01) | |
| *B60R 16/023* | (2006.01) | |
| *H01R 13/514* | (2006.01) | |
| *H01R 13/405* | (2006.01) | |

(52) U.S. Cl.
CPC .......... *B60R 16/0238* (2013.01); *H01R 13/514* (2013.01); *H01R 13/405* (2013.01); *H01R 2201/26* (2013.01)

(58) Field of Classification Search
CPC ............. B60R 16/0238; H01R 13/514; H01R 13/405; H01R 2201/26
USPC .......................... 439/76.1, 76.2, 540.1, 541.5
See application file for complete search history.

(56) References Cited

U.S. PATENT DOCUMENTS

| | | | | |
|---|---|---|---|---|
| 4,799,893 | A * | 1/1989 | Ogawa et al. ................ | 439/76.2 |
| 4,850,884 | A * | 7/1989 | Sawai et al. .................. | 439/76.2 |
| 6,437,986 | B1 * | 8/2002 | Koshiba ....................... | 439/76.2 |
| 6,541,700 | B2 * | 4/2003 | Chiriku et al. ................. | 174/50 |
| 7,614,886 | B2 * | 11/2009 | Choi ............................ | 439/76.2 |

(Continued)

FOREIGN PATENT DOCUMENTS

| | | |
|---|---|---|
| CN | 101291049 A | 10/2008 |
| CN | 201185243 Y | 1/2009 |
| CN | 102630122 A | 8/2012 |

(Continued)

OTHER PUBLICATIONS

Office Action dated Aug. 4, 2015, issued by State Intellectual Property Office Of The People's Republic Of China in counterpart Chinese Application No. 201310553413.8.

*Primary Examiner* — Khiem Nguyen
(74) *Attorney, Agent, or Firm* — Sughrue Mion, PLLC

(57) ABSTRACT

A connecting block assembly includes a plurality of connecting block parts for connecting electric components which are assembled to each other. Each of the connecting block parts includes a plurality of conductive terminals having electric connecting portions and extended portions extended from the electric connecting portions respectively, and an insulating resin member which fixes the plurality of terminals at positions of the extended portions. A coupling portion is formed on one side wall of the resin member in a coupling direction being perpendicular to both of an extending direction of the extended portions and an arranging direction of the plurality of terminals, and a coupled portion having a shape to be coupled to the coupling portion is formed on the other side wall of the resin member in the coupling direction.

6 Claims, 16 Drawing Sheets

(56) References Cited

U.S. PATENT DOCUMENTS

2008/0261459 A1  10/2008  Choi
2012/0202383 A1   8/2012  Harao et al.

FOREIGN PATENT DOCUMENTS

EP   1187258 A1    3/2002
JP   2006-333583 A  12/2006

* cited by examiner

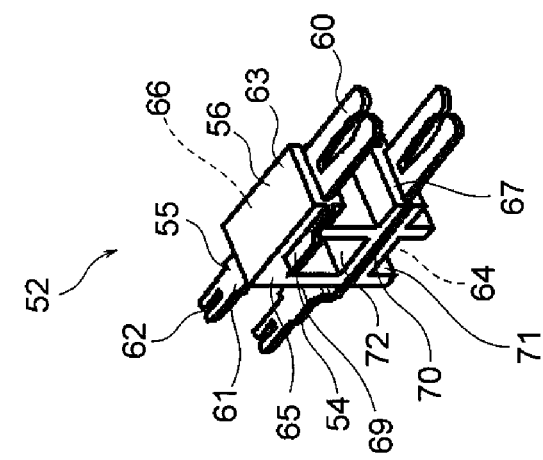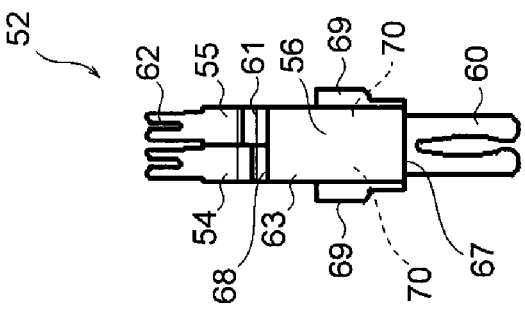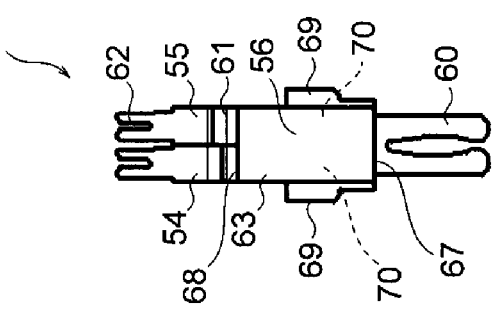

CONNECTING BLOCK ASSEMBLY

BACKGROUND

The present invention relates to a connecting block assembly which is configured by assembling connecting block parts.

As an electric apparatus to be mounted on a vehicle such as an automobile, there has been known an electric junction box, for example. The electric junction box has been known as a name generally calling a relay box, a fuse box, or a junction block, an electronic control unit box, etc.

In an electric junction box which is disclosed in JP-A-2006-333583, a plurality of loads are connected to a downstream side by way of a wire harness. The electric junction box has a function and a structure for distributing electric power or the like to the plurality of loads. The electric junction box disclosed in JP-A-2006-333583 will be described below.

In FIG. 15, reference numeral 101 represents an electric junction box. In this drawing, the electric junction box 101 is shown in a state where a cover member is omitted. The electric junction box 101 includes a circuit board 102, electronic components 103, connectors 104, 105 (connector blocks), a fuse block 106, an ECU connecting connector 107, and other constituent members.

The electronic components 103 are mounted on the circuit board 102. Moreover, the connectors 104, 105, the fuse block 106 and the ECU connecting connector 107 are also assembled to the circuit board 102. The electronic components 103, the connectors 104, 105, the fuse block 106 and the ECU connecting connector 107 are electrically connected to predetermined positions of a circuit pattern which is formed on the circuit board 102. The electronic components 103 include a plurality of switching transistors 108, an integrated circuit 109, and so on, which are electrically connected by way of connecting portions of their respective terminals.

The connector 104 includes a connector housing 110, and a plurality of L-shaped terminals 111. The connector housing 110, which is a resin component, has a housing body 112 adapted to be engaged with a mating connector, which is not shown, and a housing securing part to be screw-fitted to the circuit board 102. The L-shaped terminals 111 are arranged in such a manner that respective one ends thereof can be electrically connected to the mating connector, which is not shown, in a state surrounded by the housing body 112. The other ends of the L-shaped terminals 111 are passed through holes in the circuit board 102, and soldered to a predetermined circuit pattern.

The connector 105 is constructed in the same manner as the connector 104. Specifically, the connector 105 includes a connector housing 113, and a plurality of L-shaped terminals 114. The connector housing 113, which is a resin component, has a housing body 115 adapted to be engaged with a mating connector, which is not shown, and a housing securing part to be screw-fitted to the circuit board 102. The L-shaped terminals 114 are arranged in such a manner that respective one ends thereof can be electrically connected to the mating connector, which is not shown, in a state surrounded by the housing body 113. The other ends of the L-shaped terminals 114 are passed through holes in the circuit board 102, and soldered to a predetermined circuit pattern.

In FIGS. 15 and 16, the fuse block 106, which is a region where fuses of a blade type are mounted, includes a fuse cover 116, a terminal holder 117, and a group 118 of layered terminals. The fuse cover 116 and the terminal holder 117 are structures formed of resin and have insulating performance.

Moreover, the group 118 of the layered terminals includes terminal groups 119 to 122 which are arranged in a state of a plurality of layers, and has electrical conductivity.

The fuse cover 116 has fuse mounting parts 123, 124, a housing 125, a connector housing 126, and a locking arm 127. The fuse mounting part 123 is arranged above the fuse mounting part 124. The housing 125 and the connector housing 126 are provided at the left side of the fuse mounting part 123. Moreover, the locking arm 127 is formed at the right side of the fuse mounting parts 123, 124.

The fuse mounting parts 123, 124 respectively have a plurality of fuse cavities 128. The plurality of fuse cavities 128 are formed so as to be arranged in a lateral direction. The fuses of the blade type are inserted into the fuse cavities 128 from a front side to a rear side thereof. The fuse mounting parts 123, 124 are arranged above and below. The housing 125 is formed as a region where a fusible link is to be mounted. Moreover, the connector housing 126 is formed as a connecting part of a main power supply and a power supply for an alternator.

The terminal holder 117 is formed for the purpose of holding the terminal groups 119 to 122 which compose the group 118 of the layered terminals. A locking projection 129 to be engaged with the locking arm 127 of the fuse cover 116 is formed on a side face of the terminal holder 117.

As described above, the group 118 of the layered terminals includes the plurality of terminal groups 119 to 122. Describing them from the below to the above, the terminal group 119 is arranged in a first layer, the terminal group 120 is arranged in a second layer, the terminal group 121 is arranged in a third layer, and the terminal group 122 is arranged in a fourth layer.

The terminal group 119 in the first layer has a plurality of L-shaped terminals 130, and is configured by arranging these L-shaped terminals 130 in the lateral direction. In addition, the terminal group 119 has a power supply input terminal 131. Fork-shaped terminal portions 132 are formed at respective one ends of the L-shaped terminals 130, and board connecting portions 133 are formed at the other ends thereof.

The terminal group 120 in the second layer has a plurality of L-shaped terminals 134, and is configured by arranging these L-shaped terminals 134 in the lateral direction. In addition, the terminal group 120 has a power supply input terminal 135. Fork-shaped terminal portions 136 are formed at respective one ends of the L-shaped terminals 134, and board connecting portions 137 are formed at the other end thereof.

The terminal group 121 in the third layer has a plurality of L-shaped terminals 138, and is configured by arranging these L-shaped terminals 138 in the lateral direction. In addition, the terminal group 121 has a terminal 139 for the fusible link. Fork-shaped terminal portions 140 are formed at respective one ends of the L-shaped terminals 138, and board connecting portions 141 are formed at the other end thereof.

The terminal group 122 in the fourth layer has a plurality of L-shaped terminals 142, and is configured by arranging these L-shaped terminals 142 in the lateral direction. In addition, the terminal group 122 has a terminal 143 for the fusible link. Fork-shaped terminal portions 144 are formed at respective one ends of the L-shaped terminals 142, and board connecting portions 145 are formed at the other end thereof.

Intermediate areas of the plurality of L-shaped terminals 130, 134, 138, 142 are respectively contained and held in the terminal holder 117. When the fuse cover 116 is locked to the terminal holder 117, the fork-shaped terminal portions 132, 136, 140, 144 are respectively contained and held in the corresponding fuse cavities 128.

By the way, in the above described related art, the mounting number of the fuses, the fusible links, etc. (the number of junctions) is inevitably determined for structural reason.

Therefore, in case of increasing the mounting number of the fuses for the purpose of grading up a vehicle, for example, it is impossible to flexibly cope with. Therefore, the related art has a problem of low versatility.

SUMMARY

The invention has been made in view of the above described circumstances, and it is an object of the invention to provide a connecting block assembly having high versatility, in which the mounting number of electric components can be increased or decreased.

In order to solve the above described problem, according to the invention, there is provided a connecting block assembly comprising:

a plurality of connecting block parts for connecting electric components, the plurality of connecting block parts being assembled to each other, wherein each of the connecting block parts includes:

a plurality of conductive terminals having electric connecting portions and extended portions extended from the electric connecting portions respectively; and an insulating resin member which fixes the plurality of terminals at positions of the extended portions; and wherein a coupling portion is formed on one side wall of the resin member in a coupling direction being perpendicular to both of an extending direction of the extended portions and an arranging direction of the plurality of terminals, and a coupled portion having a shape to be coupled to the coupling portion is formed on the other side wall of the resin member in the coupling direction.

According to the above described feature, by coupling the coupling portions and the coupled portions of the adjacent connecting block parts to each other, it is possible to obtain the connecting block assembly having the connecting block parts of the number corresponding to the mounting number of the electric components.

For example, the coupling portion is formed in a convex shape, and the coupled portion is formed in a concave shape, and the coupling portion and the coupled portion are formed so as to be coupled to each other in a press-fitted manner.

According to the above described feature, the adjacent connecting block parts are coupled by press-fitting between the concave shape and convex shape.

For example, the plurality of terminals are fixed in the resin member by insert molding.

According to the above described feature, the plurality of terminals are fixed to the resin member by insert molding.

For example, other coupling portion or other coupled portion to be coupled to an adjacent connecting block in the plurality of connecting block parts, which is the other connecting block, is formed on the one side wall of the resin member in the arranging direction.

According to the above described feature, it becomes possible to couple the connecting block assembly to the other connecting block, which is the other connecting block, by way of the other coupling portion or the other coupled portion. It is to be noted that the other connecting block may include either a block in a shape of a part or a unit configured by coupling parts.

For example, the plurality of terminals are connected to a circuit board, and fuse terminals which are provided on fuses are connected to the electric connecting portions. Also, for example, types of the plurality of connecting block parts are different.

According to the above described feature, the connecting block assembly functions as a fuse block which is provided with a required number of the fuses, and connected to the circuit board.

According to the above configuration, the connecting block parts can be advantageously increased or decreased according to the mounting number of the electric components. Therefore, it is possible to achieve such advantage that versatility can be enhanced.

According to the above configuration, the following advantage can be also achieved. Specifically, the adjacent connecting block parts can be advantageously coupled by press-fitting between the concave shape and convex shape. According to the invention, it is possible to achieve such advantages that the coupling can be easily performed with a simple structure, and that the coupling can be made in a stable state.

According to the above configuration, the following advantage can be also achieved. Specifically, because the plurality of terminals are fixed to the resin member by insert molding, it is possible to achieve such advantage that the plurality of terminals can be accurately fixed without a backlash.

According to the above configuration, the following advantage can be also achieved. Specifically, because the connecting block assembly further has the other coupling portion or the other coupled portion, it is possible to achieve such advantage that the connecting block assembly can be coupled to the adjacent connecting block, which is the other connecting block.

According to the above configuration, the following advantage can be also achieved. Specifically, it is possible to achieve such advantage that the connecting block assembly can be provided as a fuse block.

BRIEF DESCRIPTION OF THE DRAWINGS

The above objects and advantages of the present invention will become more apparent by describing in detail preferred exemplary embodiments thereof with reference to the accompanying drawings, wherein:

FIG. 11A is a perspective view of the fuse block part;

FIG. 11B is a plan view of the fuse block part;

FIG. 11C is a perspective view of the fuse block part;

DETAILED DESCRIPTION OF EXEMPLARY EMBODIMENTS

The connecting block assembly is configured by assembling a plurality of connecting block parts for connecting electric components, or by assembling a plurality of connecting block parts of a plurality of types. The connecting block assembly as a fuse block is connected to a circuit board, and a required number of fuses are mounted on this connecting block assembly.

Embodiment 1

Figure 1:
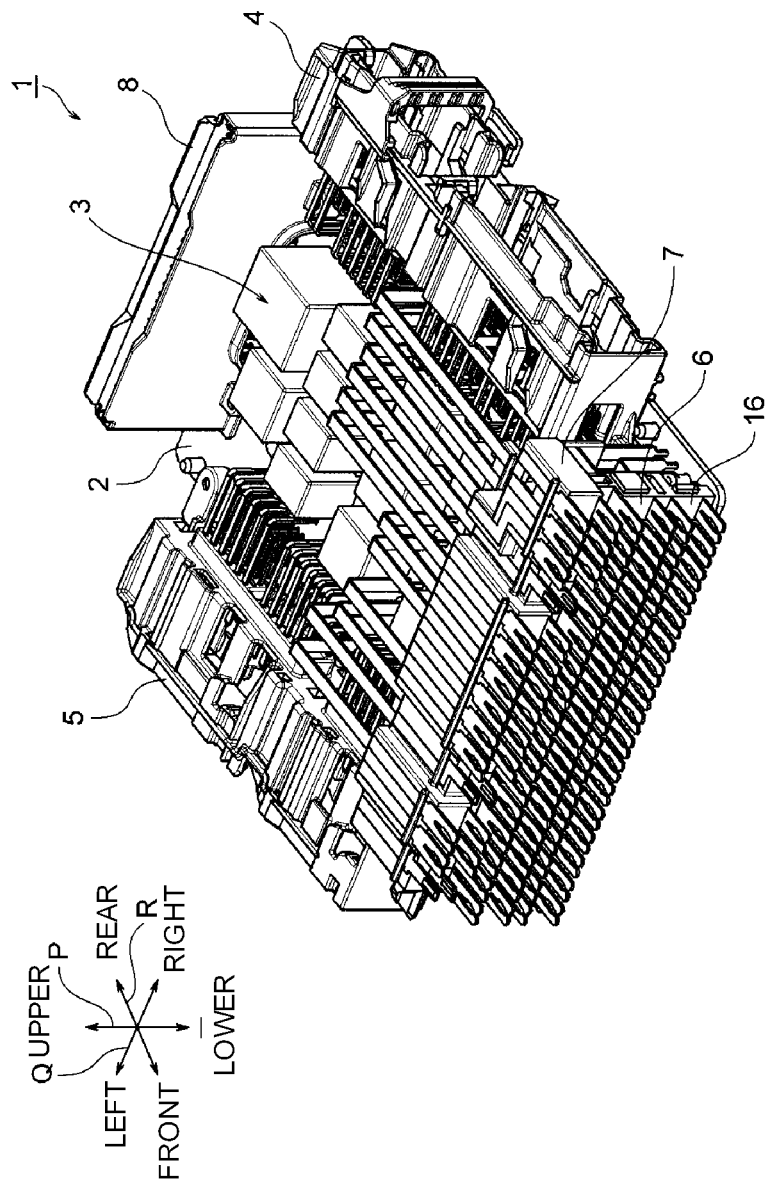
FIG. 1 is a perspective view of an electric junction box including a first fuse block according to a connecting block assembly of an Embodiment 1.
Figure 2:
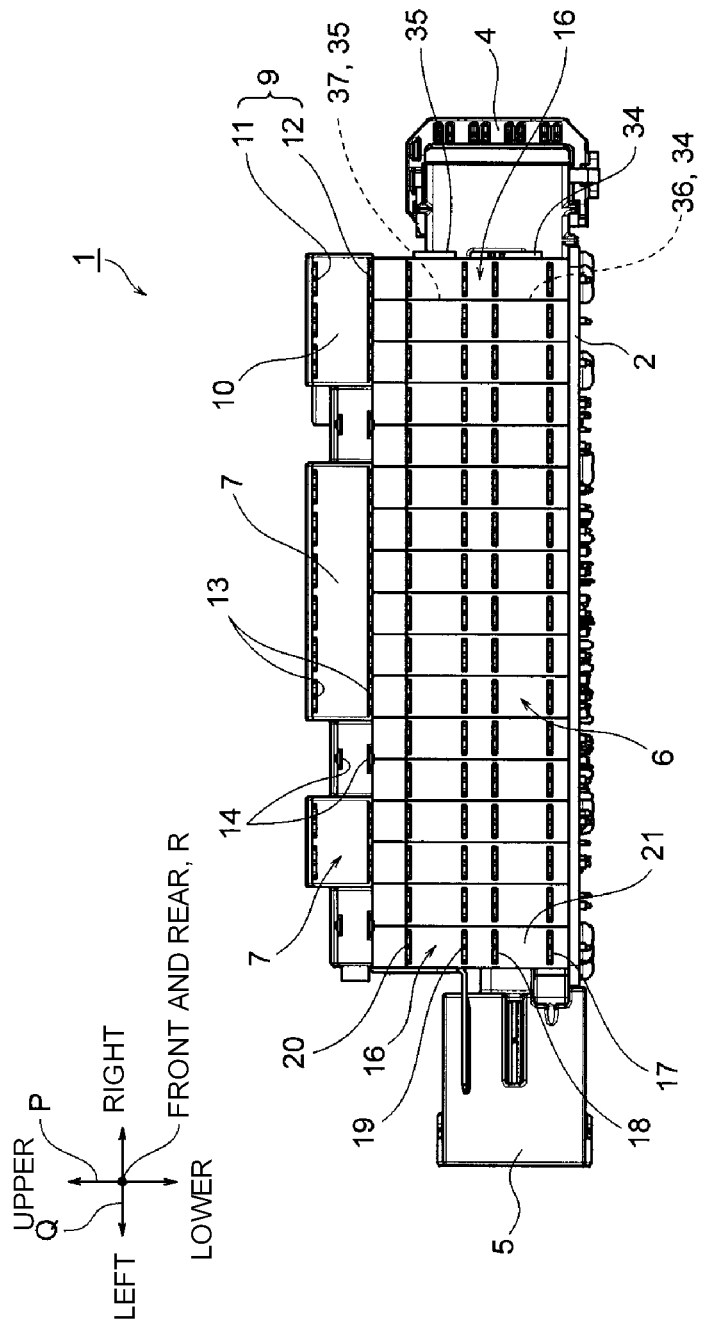
FIG. 2 is a front view of the electric junction box in FIG. 1.
Figure 3:
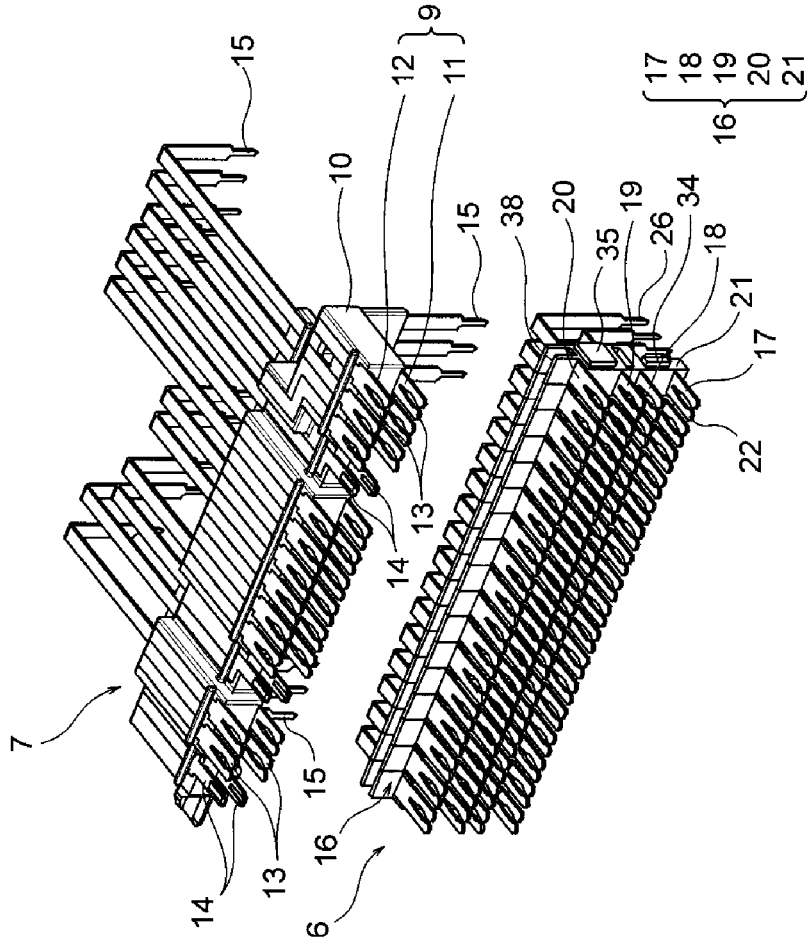
FIG. 3 is a perspective view of the first fuse block and a second fuse block, before they are assembled.
Figure 4:
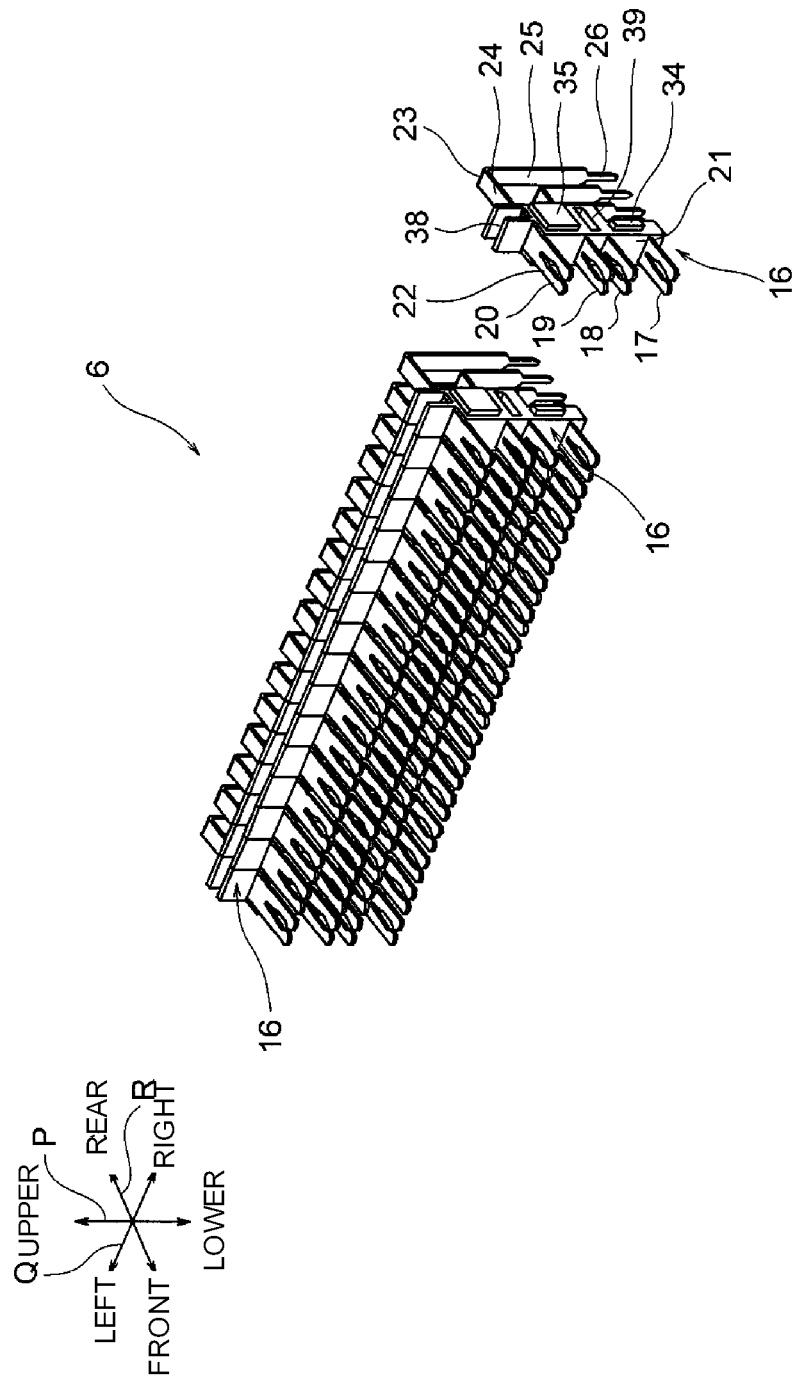
FIG. 4 is a perspective view of the first fuse block in a state where a fuse block part is being coupled.
Figure 5:
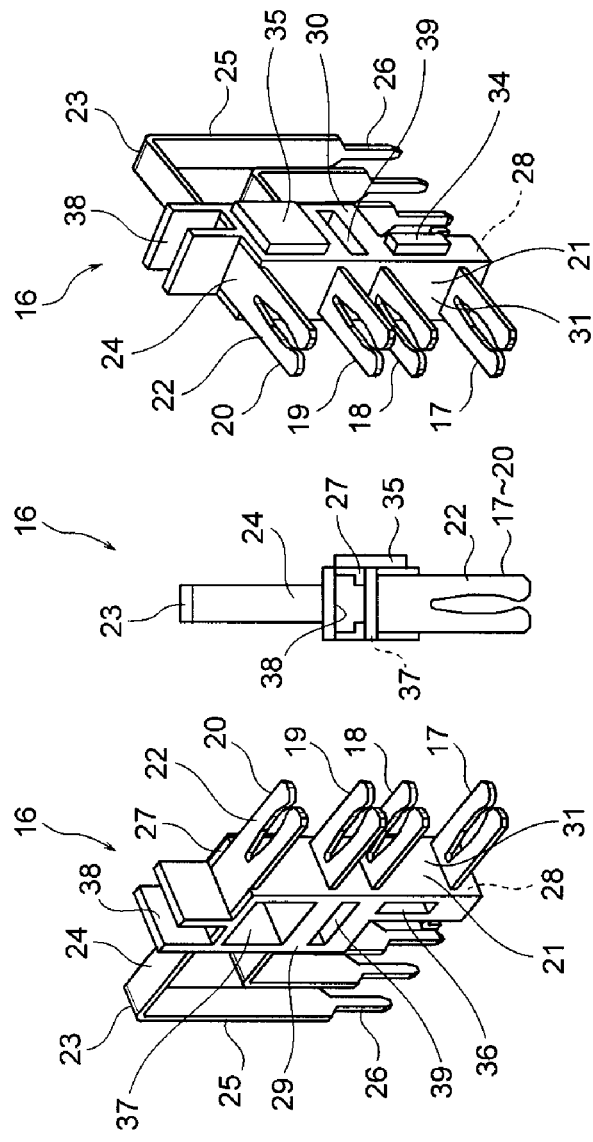
FIG. 5A is a perspective view of the fuse block part.
FIG. 5B is a plan view of the fuse block part.
FIG. 5C is a perspective view of the fuse block part.
Figure 6:
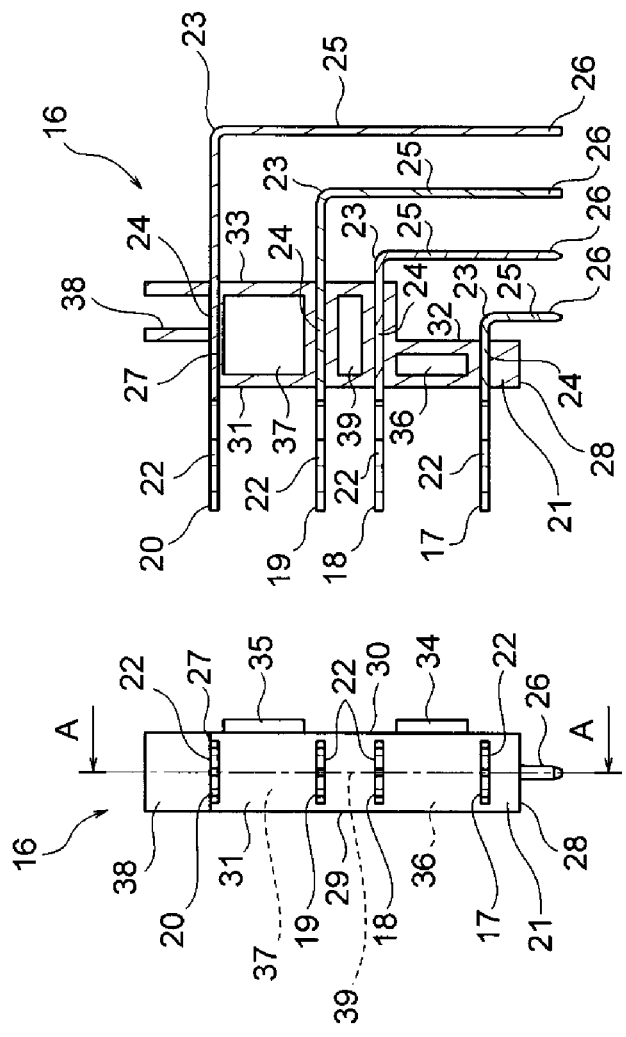
FIG. 6A is a front view of the fuse block part.
FIG. 6B is a sectional view taken along a line A-A in FIG. 6A.
Figure 7:
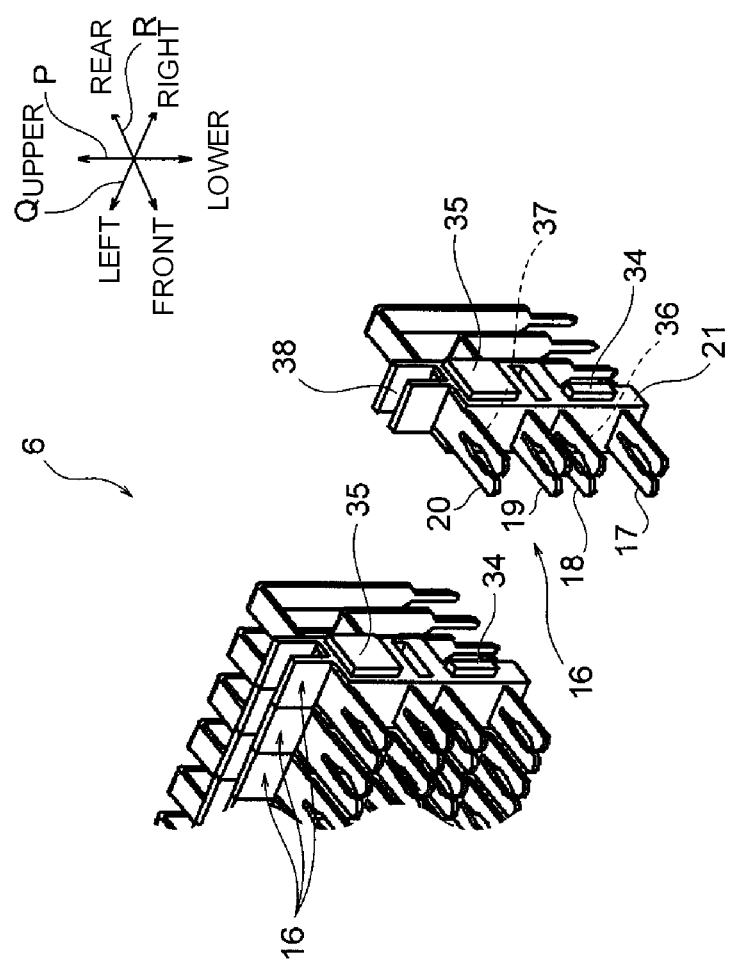
FIG. 7 is an enlarged perspective view in a state where the fuse block part is being coupled.
Figure 8:
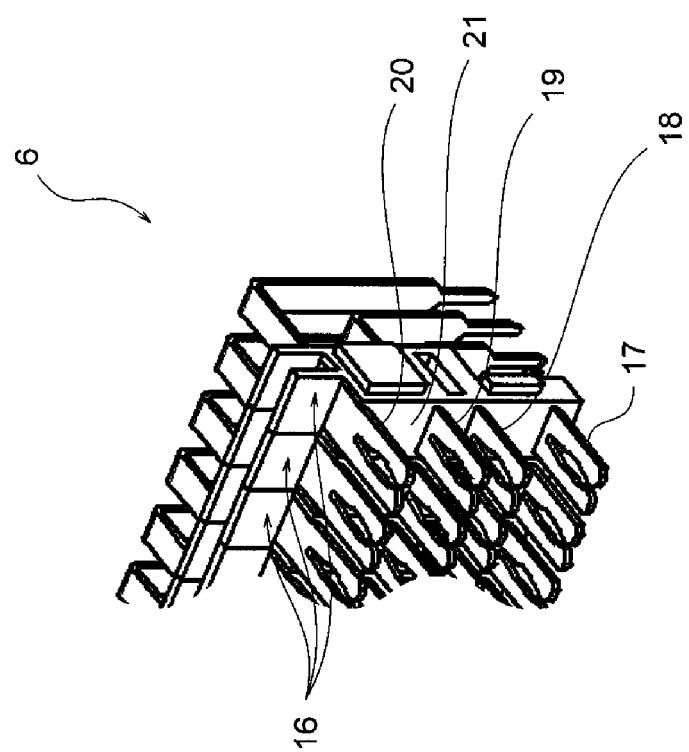
FIG. 8 is an enlarged perspective view of the fuse block parts after they have been coupled.

Referring to the drawings, the Embodiment 1 will be described. FIG. 1 is a perspective view of an electric junction box including a first fuse block according to the connecting block assembly of the Embodiment 1. FIG. 2 is a front view of the electric junction box in FIG. 1. FIG. 3 is a perspective view of the first fuse block and a second fuse block, before they are assembled. FIG. 4 is a perspective view of the first fuse block, in a state where a fuse block part is being coupled. FIGS. 5A to 6B are views showing the fuse block part. FIGS. 7 and 8 are enlarged perspective views in a state where the fuse block part is being coupled, and after the coupling has been completed.

It is to be noted that specific shapes, materials, numerical values, directions, etc. in the following description are only examples for enabling the invention to be easily understood, and can be adequately modified according to their uses, objects, specifications, etc. Moreover, although the description will be made referring to an electric junction box to be mounted on an automobile, it is also possible to apply this invention to various electrical appliances, besides the electric junction box for the automobile.

In FIGS. 1 and 2, reference numeral 1 represents an electric junction box. Herein, the electric junction box 1 is shown in a state where a cover member is omitted. The electric junction box 1 includes a circuit board 2, components 3 to be mounted on the board, a first connector block 4, a second connector block 5, a first fuse block (connecting block assembly) 6, a second fuse block 7, and an ECU connecting connector 8.

The components 3 to be mounted on the board are mounted on the circuit board 2. Moreover, the first connector block 4, the second connector block 5, the first fuse block 6, the second fuse block 7, and the ECU connecting connector 8 are also assembled to the circuit board 2. These components 3 to be mounted on the board through the ECU connecting connector 8 are electrically connected to predetermined positions of a circuit pattern which is formed on the circuit board 2.

The components 3 to be mounted on the board include electric components such as a relay (a switching transistor, an integrated circuit and so on may be mounted in the same manner as in the related art). The first connector block 4, the second connector block 5, and the ECU connecting connector 8 are the same as those which have been known, and their detailed description will be omitted herein.

A structure of the first fuse block 6 and a structure of the second fuse block 7 which is assembled to this first fuse block 6 will be described.

In the following description, an arrow P in the drawings represents a vertical direction, an arrow Q represents a lateral direction, and an arrow R represents a longitudinal direction. Moreover, the direction of the arrow P is shown as an assembling direction of the first fuse block 6 and the second fuse block 7, and also, as an arranging direction of terminals of fuse block parts (connecting bock part) 16, which will be described below. Further, the direction of the arrow Q is shown as a coupling direction of the fuse block parts 16, and the direction of the arrow R is shown as an extending direction of horizontal plate portions 24 (extended portions), which will be described below.

In FIGS. 1 to 3, the first fuse block 6 is assembled to the circuit board 2 so as to be mounted thereon. The second fuse block 7 is assembled to the circuit board 2 in a state mounted on the first fuse block 6.

The second fuse block 7 will be first described. The second fuse block 7 corresponds to a second connecting block or an adjacent connecting block as the other connecting block, and includes a group 9 of layered terminals having electrical conductivity and an insulating resin member 10 for fixing this group 9 of the layered terminals.

In the group 9 of the layered terminals, terminal groups 11, 12 are configured by arranging a plurality of terminals and a plurality of types of terminals in the direction of the arrow Q (the lateral direction). The group 9 of the layered terminals is configured by stacking these terminal groups 11, 12 in a layered manner in the direction of the arrow P (the vertical direction). The terminal groups 11, 12 have fork-shaped terminal portions 13 and terminal portions 14 for fusible links which are projected frontward. Moreover, the terminal groups 11, 12 also have board connecting portions 15 which are projected downward. The resin member 10 is so formed as to fix the terminal groups 11, 12 at predetermined positions, and also so as to be coupled to the first fuse block 6. This coupling portion corresponds to the other coupling portion (not shown in the drawings).

In FIGS. 3 and 4, the first fuse block 6 corresponds to the connecting block assembly according to the invention. Specifically, a plurality of (17 pieces, in this embodiment, the number is only an example) fuse block parts 16 (connecting block parts) for connecting electric components (herein, fuses which are not shown) are coupled in the direction of the arrow Q (the lateral direction). The fuse block parts 16 include a plurality of L-shaped terminals 17 to 20 (terminals) having electric conductivity, and insulating resin members 21 for fixing these L-shaped terminals 17 to 20.

In FIGS. 5A to 6B, the L-shaped terminals 17 to 20 are formed by bending strip-like plates respectively having predetermined lengths, into an L-shape. The L-shaped terminals 17 to 20 are different from one another only in size, but their respective portions have the same functions. Herein, they are denoted with the same reference numerals. The L-shaped terminals 17 to 20 are bent in an L-shape, considering a mounting direction of the fuses with respect to the circuit board 2 (This is not necessarily, in case where the mounting direction is vertical with respect to the circuit board 2).

Each of the L-shaped terminals 17 to 20 is provided with a fork-shaped terminal portion (electric connecting portion) 22 at its one end. Moreover, a bent portion 23 is formed in an intermediate part thereof. The fork-shaped terminal portion 22 is formed in a shape of a tuning fork, as a portion for connecting the fuse terminal of the fuse. A horizontal plate portion (extended portion) 24 which is extended substantially horizontally with respect to the circuit board 2 (See FIG. 1), and in the direction of the arrow R (the longitudinal direction) is formed between the fork-shaped terminal portion 22 and the bent portion 23. Further, each of the L-shaped terminals 17 to 20 is provided with a vertical plate portion 25 which is extended substantially vertically with respect to the circuit board 2, and in the direction of the arrow P (the vertical direction) is formed at the other end thereof. A board connecting portion 26 in a shape of a pin is formed continuously from this vertical plate portion 25.

The fork-shaped terminal portions 22 of the L-shaped terminals 17 to 20 are arranged at the same position in a completed state of the fuse block parts 16. Moreover, the fork-shaped terminal portions 22 of the L-shaped terminals 17 and 18, and the fork-shaped terminal portions of the L-shaped terminals 19 and 20 are arranged corresponding to positions of the aforesaid fuse terminals. Further, the respective board connecting portions 26 of the L-shaped terminals 17 to 20 are arranged at an equal pitch in the completed state of the fuse block parts 16. In addition, the L-shaped terminal 17 is so formed as to have the shortest horizontal plate portion 24 and the shortest vertical plate portion 25. The horizontal and vertical plate portions 24, 25 are made longer as going above, so that the L-shaped terminal 20 has the longest horizontal and vertical plate portions 24, 25.

The L-shaped terminals 17 to 20 are fixed to the resin members 21 at positions of their horizontal plate portions 24. In this embodiment, they are fixed by insert molding. A fixing method is not limited to the insert molding. As an example of the other fixing methods, the L-shaped terminals 17 to 20 may be fixed, by forming locking hooks in respective side parts of the horizontal plate portions 24, and by engaging these locking hooks with press-fitting holes in the resin members 21.

Each of the resin members 21 is a part formed by resin molding, and has an upper face 27, a lower face 28, a left side face 29, a right side face 30, a front face 31, and rear faces 32, 33. The rear faces 32, 33 are formed in a step-like shape having two stages. Moreover, the resin member 21 has a predetermined width and height according to the aforesaid fuse. The front face 31 of the resin member 21 is formed as a region from which the fork-shaped terminal portions 22 are straightly projected frontward. Moreover, coupling portions 34, 35 are formed on the right side face 30, and coupled portions 36, 37 are formed on the left side faces 29. Further, a second coupled portion 38 is formed on the upper face 27. Besides, an escape 39 is formed so as to pass through the left side face 29 and the right side face 30.

The coupling portions 34, 35 are respectively formed as rectangular convex portions having different shapes. On the other hand, the coupled portions 36, 37 are formed so as to match with the shapes of the coupling portions 34, 35. Specifically, the coupled portions 36, 37 are formed as rectangular concave portions into which the coupling portions 34, 35 are to be inserted. The coupling portions 34, 35 and the coupled portions 36, 37 are coupled in a press-fitted manner.

It is to be noted that the coupling portions 34, 35 and the coupled portions 36, 37 may be exchanged in position between right and left. Moreover, both of them may be arranged on one side face, in the same manner as in Embodiment 2, which will be described below.

The second coupled portion 38 is formed as a coupling portion to be coupled to the second fuse block 7. Specifically, a second coupling portion (not shown) of the second fuse block 7 is inserted into the second coupled portion 38 to be brought into a coupled state. It is to be noted that the second coupled portion 38 may be formed as a convex coupling portion instead of a concave coupled portion (In this case, the coupled portion is to be formed in the second fuse block 7).

Then, referring to FIGS. 7 and 8, assembling (coupling) of the first fuse block 6 according to the invention will be described.

As shown in FIGS. 7 and 8, the assembling of the first fuse block 6 is completed, by coupling a required number of the fuse block parts 16. Specifically, the coupling portions 34, 35 and the coupled portions 36, 37 of the adjacent fuse block parts 16 are coupled to each other by press-fitting. In this manner, the assembling of the first fuse block 6 composed of the fuse block parts 16 of the number corresponding to the mounting number of the fuses, which are not shown, is completed.

Because the two fuses can be mounted on each one of the fuse block parts 16 in this embodiment, "the number corresponding to the mounting number" is one half of the required mounting number.

As described above referring to FIGS. 7 and 8, the number of the fuse block parts 16 in the first fuse block 6 can be increased or decreased, according to the mounting number of the fuses which are not shown. As the results, versatility of the first fuse block 6 can be enhanced.

Embodiment 2

Figures 9A, 9B:
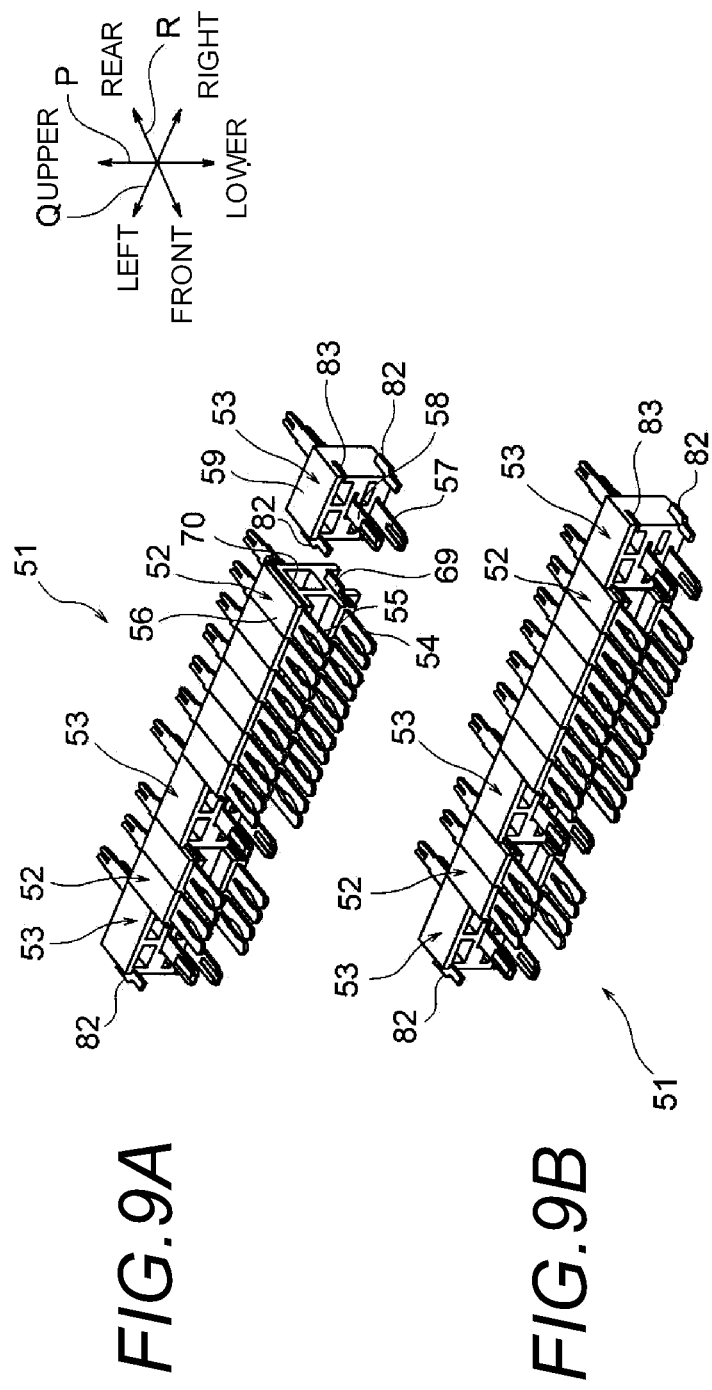
FIG. 9A is a perspective view of the first fuse block according to the connecting block assembly of an Embodiment 2, on a halfway of coupling.
FIG. 9B is a perspective view of the first fuse block according to the connecting block assembly of the Embodiment 2, after the coupling has been completed.
Figures 10A, 10B:
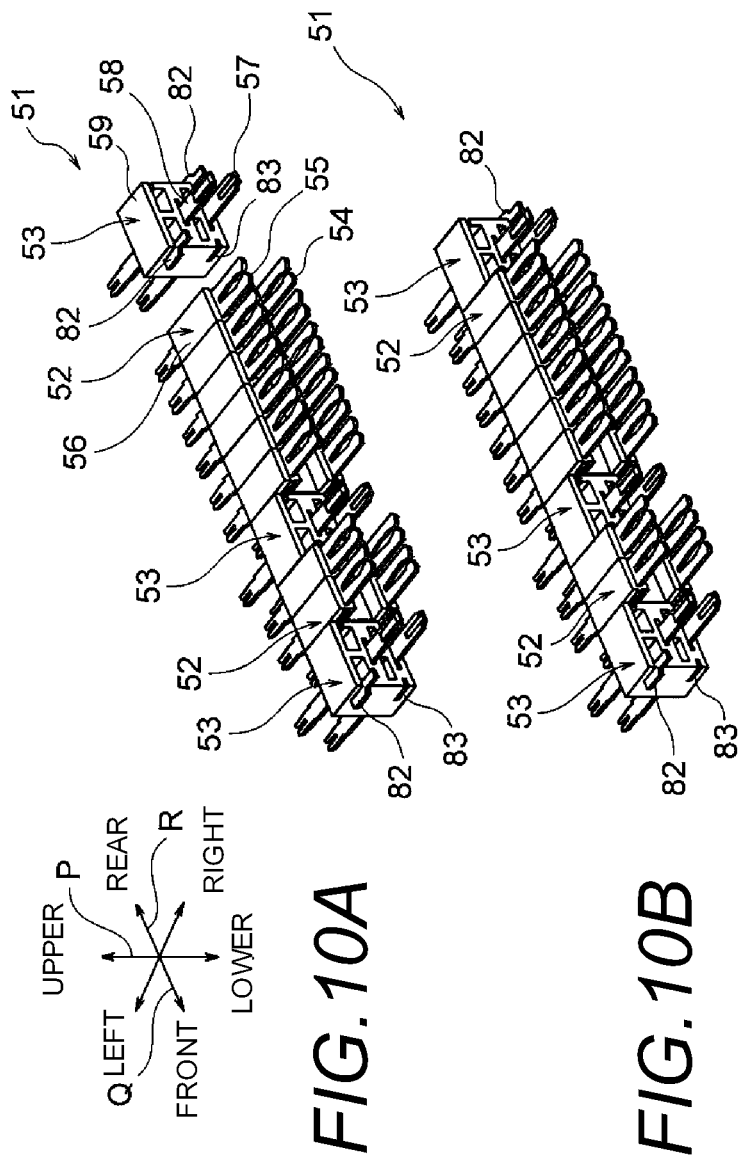
FIG. 10A is a perspective view similar to FIG. 9A, on a halfway of coupling.
FIG. 10B is a perspective view similar to FIG. 9B, after the coupling has been completed.
Figure 12A:
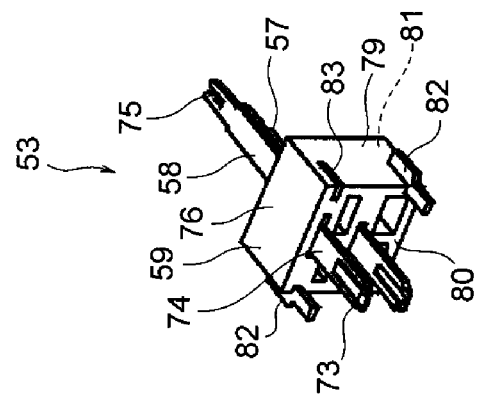
FIG. 12A is a perspective view of an F/L block part.
Figure 12B:
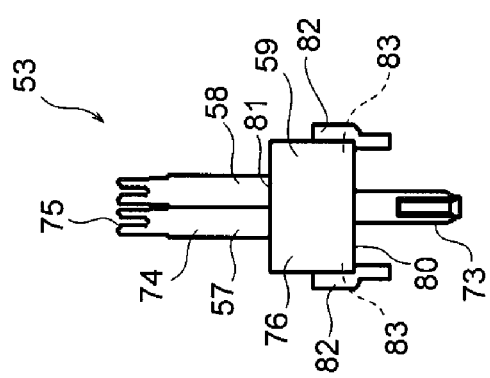
FIG. 12B is a plan view of the F/L block part.
Figure 12C:
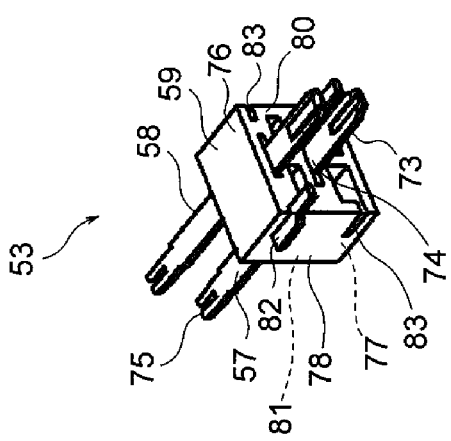
FIG. 12C is a perspective view of the F/L block part.
Figure 13:
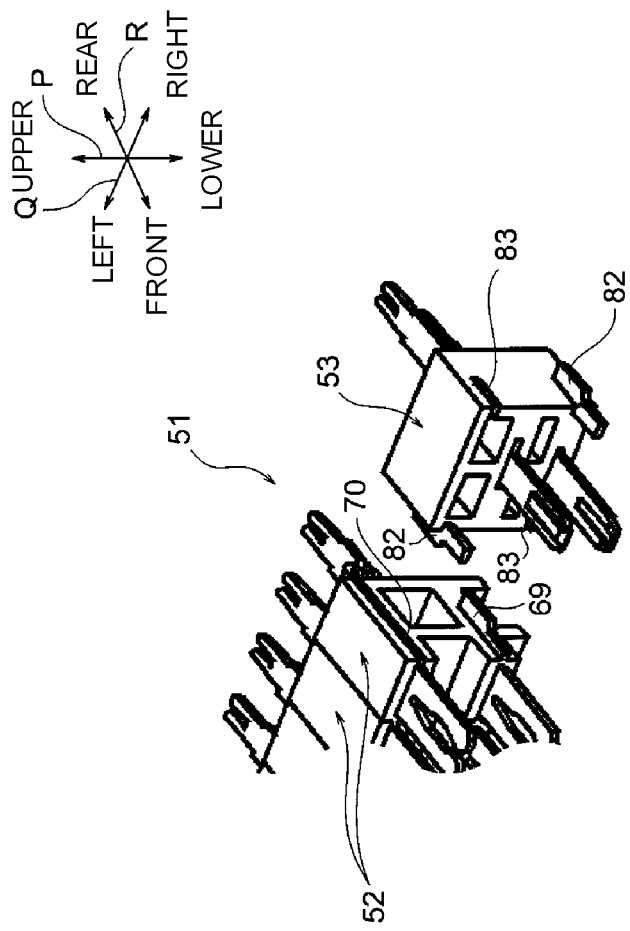
FIG. 13 is an enlarged perspective view in a state where the F/L block part is being coupled.
Figure 14:
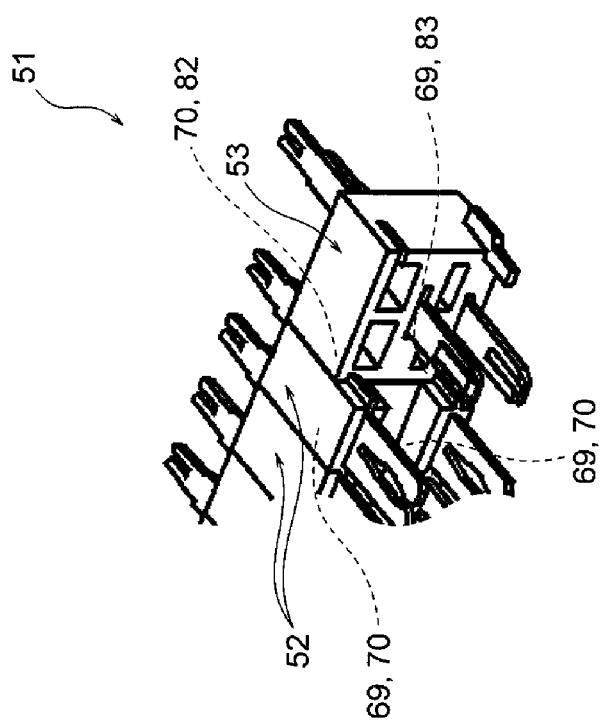
FIG. 14 is an enlarged perspective view after the F/L block part has been coupled.
Figure 15:
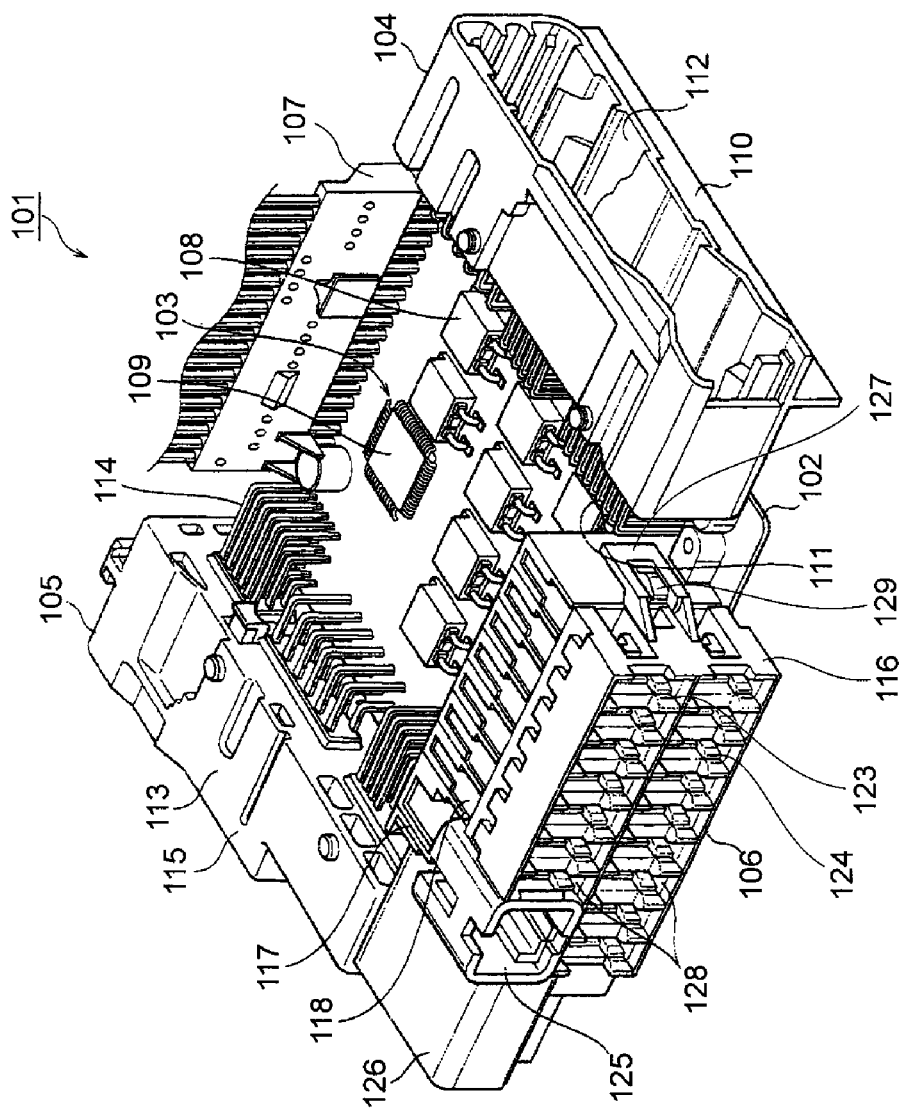
FIG. 15 is a perspective view showing a related electric junction box.
Figure 16:
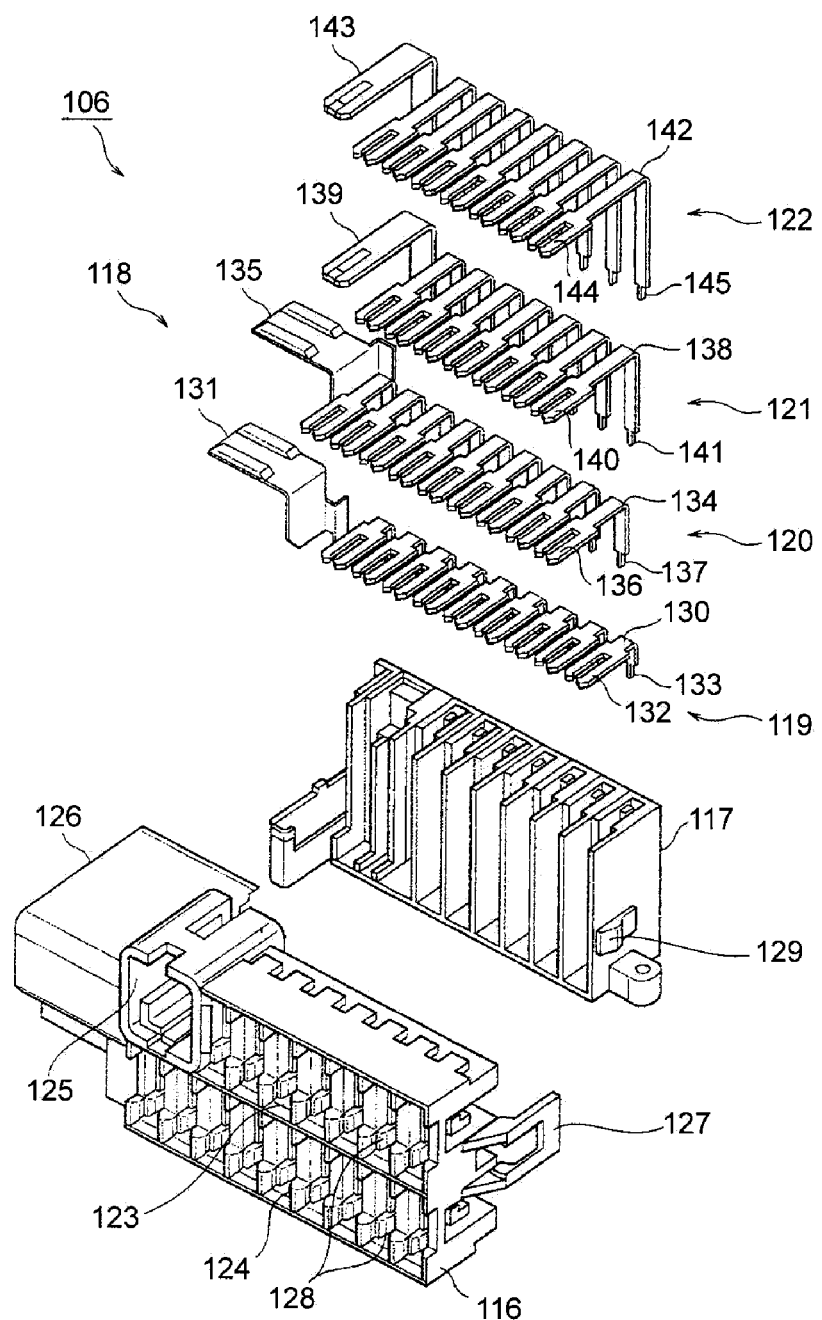
FIG. 16 is an exploded perspective view of a fuse block in FIG. 15.

Now, Embodiment 2 will be described referring to the drawings. FIGS. 9A to 10 are perspective views of the first fuse block according to the connecting block assembly of the invention. FIG. 11 is views showing a fuse block part. FIG. 12 is views showing an F/L block part. FIGS. 13 and 14 are enlarged perspective views in a state where the F/L block part is being coupled and in a state where the coupling has been completed.

In FIGS. 9A to 10B, a first fuse block 51 in Embodiment 2 corresponds to a connecting block assembly. Specifically, the first fuse block 51 is configured by assembling a plurality of (eight pieces in this embodiment, the number is only an example) fuse block parts (connecting block parts) 52 for connecting fuses (electric components) which are not shown, and a plurality of (three pieces in this embodiment, the number is only an example) F/L block parts (connecting block parts) 53 for connecting fusible links (electric components) which are not shown, in the direction of the arrow Q (the lateral direction).

Each of the fuse block parts 52 includes a pair of terminals 54, 55 having electrical conductivity and an insulating resin member 56 for fixing a pair of the terminals 54, 55. Similarly, each of the F/L block parts (Fusible Link block parts) 53 includes a pair of terminals 57, 58 having electrical conductivity and an insulating resin member 59 for fixing a pair of the terminals 57, 58.

In FIG. 11, a pair of the terminals 54, 55 in the fuse block part 52 are slightly different in shape from each other, but their respective portions have the same functions. Herein, they are denoted with the same reference numerals. Fork-shaped terminal portions (electric connecting portions) 60 are formed at respective one ends of a pair of the terminals 54, 55. Moreover, extended portions 61 which are extended in the longitudinal direction are formed in intermediate areas and at the other ends thereof. Press contact edges 62 are formed continuously from these extended portions 61.

The resin member 56 has an upper face 63, a lower face 64, a left side face 65, a right side face 66, a front face 67, and a rear face 68. Moreover, the resin member 56 has predetermined width and height corresponding to the aforesaid fuse. The front face 67 of the resin member 56 is formed as a region from which the fork-shaped terminal portions 60 straightly project frontward. Moreover, coupling portions 69 and coupled portions 70 are respectively formed on the left side face 65 and the right side face 66. A second coupled portion 71 is further formed on the lower face 64. Besides, escapes 72 are formed on the left side face 65 and the right side face 66.

The coupling portion 69 is formed as a convex portion. Moreover, the coupled portion 70 is formed as a concave portion so as to match with a shape of the coupling portion 69. The coupling portion 69 and the coupled portion 70 are coupled in a press-fitted manner.

In FIG. 12, a pair of the terminals 57, 58 in the F/L block part 53 are slightly different in shape from each other, but their respective portions have the same functions. Herein, they are denoted with the same reference numerals. Terminals (electric connecting portions) 73 for fusible links are formed at respective one ends of a pair of the terminals 57, 58. Moreover, extended portions 74 extended in the longitudinal direction are formed in intermediate areas and at the other ends thereof. Press contact edges 75 are formed continuously from these extended portions 74.

The resin member 59 has an upper face 76, a lower face 77, a left side face 78, a right side face 79, a front face 80, and a rear face 81. Moreover, the resin member 59 has predetermined width and height corresponding to the aforesaid fusible link. The front face 80 of the resin member 59 is formed as a region from which the terminal portion 73 for the fusible link straightly projects frontward. Moreover, coupling portions 82 and coupled portions 83 are respectively formed on the left side face 78 and the right side face 79.

The coupling portion 82 is formed as a convex portion. Moreover, the coupled portion 83 is formed as a concave portion so as to match with a shape of the coupling portion 82. The coupling portion 82 and the coupled portion 83 are coupled in a press-fitted manner.

Then, referring to FIGS. 13 and 14, assembling (coupling) of the first fuse block 51 according to the invention will be described.

In FIGS. 13 and 14, the assembling of the first fuse block 51 is completed, by coupling a required number of the fuse block parts 52 and a required number of the F/L block parts 53. Specifically, the coupling portions 69 and the coupled portions 70 of the adjacent fuse block parts 52 are coupled to each other by press-fitting, and the coupling portions 69 and the coupled portions 83 of the fuse block parts 52 and the F/L block parts 53 which are adjacent are coupled to each other by press-fitting. In this manner, the assembling of the first fuse block 51 composed of the connecting block parts of the number corresponding to the mounting numbers of the fuses and the fusible links, which are not shown, is completed.

As described above referring to FIGS. 9A to 14, the numbers of the fuse block parts 52 and the F/L block parts 53 in the first fuse block 51 can be increased or decreased, according to the mounting number of the fuses and the fusible links which are not shown. As the results, versatility of the first fuse block 51 can be enhanced.

Although the invention has been illustrated and described for the particular preferred embodiments, it is apparent to a person skilled in the art that various changes and modifications can be made on the basis of the teachings of the invention. It is apparent that such changes and modifications are within the spirit, scope, and intention of the invention as defined by the appended claims.

The present application is based on Japanese Patent Application No. 2012-245943 filed on Nov. 8, 2012, the contents of which are incorporated herein by reference.

What is claimed is:

1. A connecting block assembly comprising:
a plurality of connecting block parts for connecting electric components, the plurality of connecting block parts being assembled to each other,
wherein each of the connecting block parts includes:
a plurality of conductive terminals having electric connecting portions and extended portions extended from the electric connecting portions respectively; and
an insulating resin member which fixes the plurality of terminals at positions of the extended portions; and
wherein a coupling portion is formed on one side wall of the resin member in a coupling direction being perpendicular to both of an extending direction of the extended portions and an arranging direction of the plurality of terminals, and a coupled portion having a shape to be coupled to the coupling portion is formed on the other side wall of the resin member in the coupling direction.

2. The connecting block assembly according to claim 1, wherein the coupling portion is formed in a convex shape, and the coupled portion is formed in a concave shape; and
wherein the coupling portion and the coupled portion are formed so as to be coupled to each other in a press-fitted manner.

3. The connecting block assembly according to claim 1, wherein the plurality of terminals are fixed in the resin member by insert molding.

4. The connecting block assembly according to claim 1, wherein other coupling portion or other coupled portion to be coupled to an adjacent connecting block in the plurality of connecting block parts, which is the other connecting block, is formed on the one side wall of the resin member in the arranging direction.

5. The connecting block assembly according to claim 1, wherein the plurality of terminals are connected to a circuit board, and fuse terminals which are provided on fuses are connected to the electric connecting portions.

6. The connecting block assembly according to claim 1, wherein types of the plurality of connecting block parts are different.

* * * * *